Dec. 5, 1961 J. A. McDEVITT 3,011,297
POULTRY STUFFING HORN
Filed Nov. 27, 1957 2 Sheets-Sheet 2
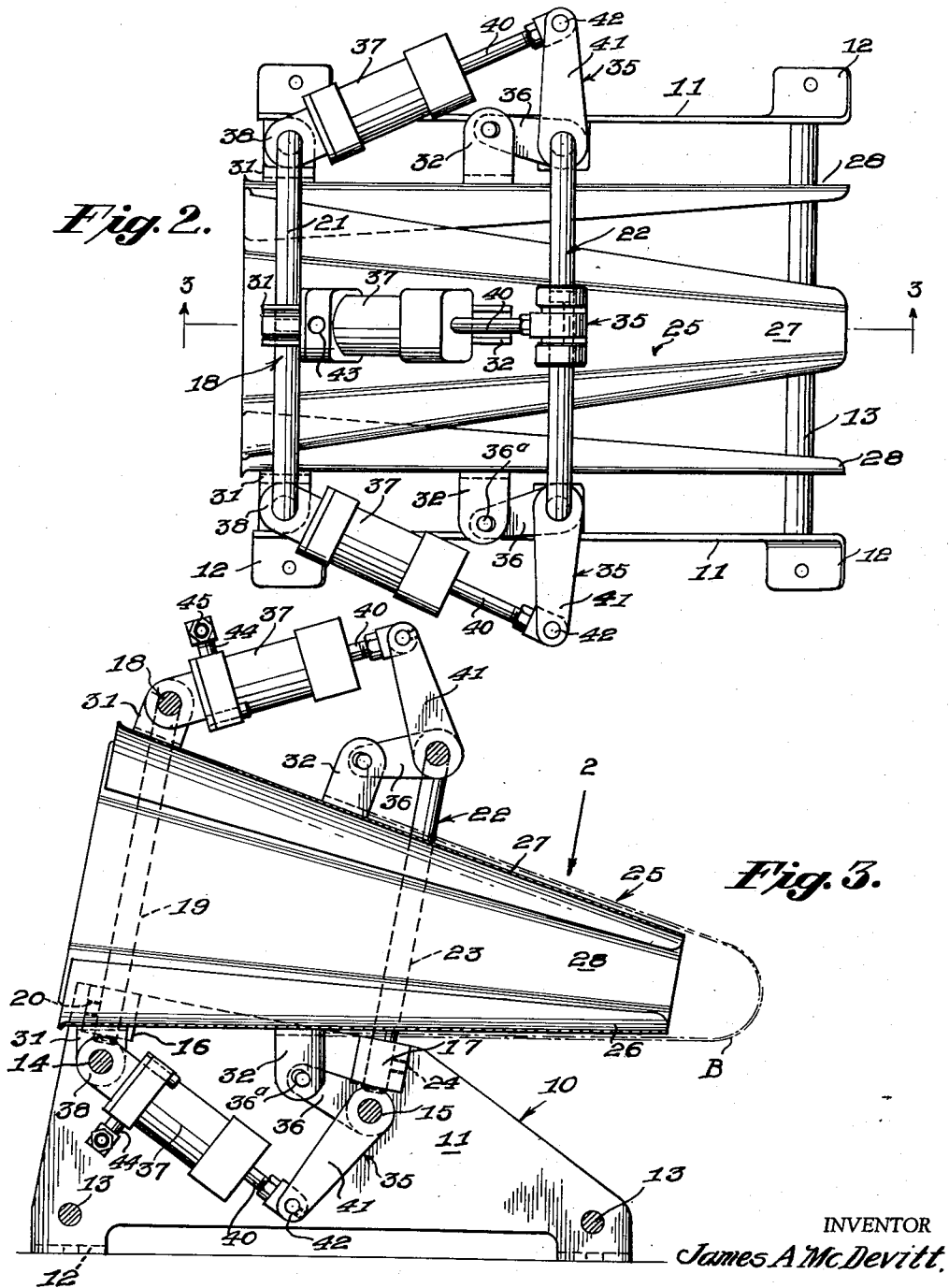
INVENTOR
James A. McDevitt,
BY
Mason, Porter, Diller & Stewart
ATTORNEY 3,011,297
POULTRY STUFFING HORN
James A. McDevitt, Mount Vernon, Ohio, assignor to Continental Can Company, Inc., New York, N.Y., a corporation of New York
Filed Nov. 27, 1957, Ser. No. 699,371
10 Claims. (Cl. 53—261)

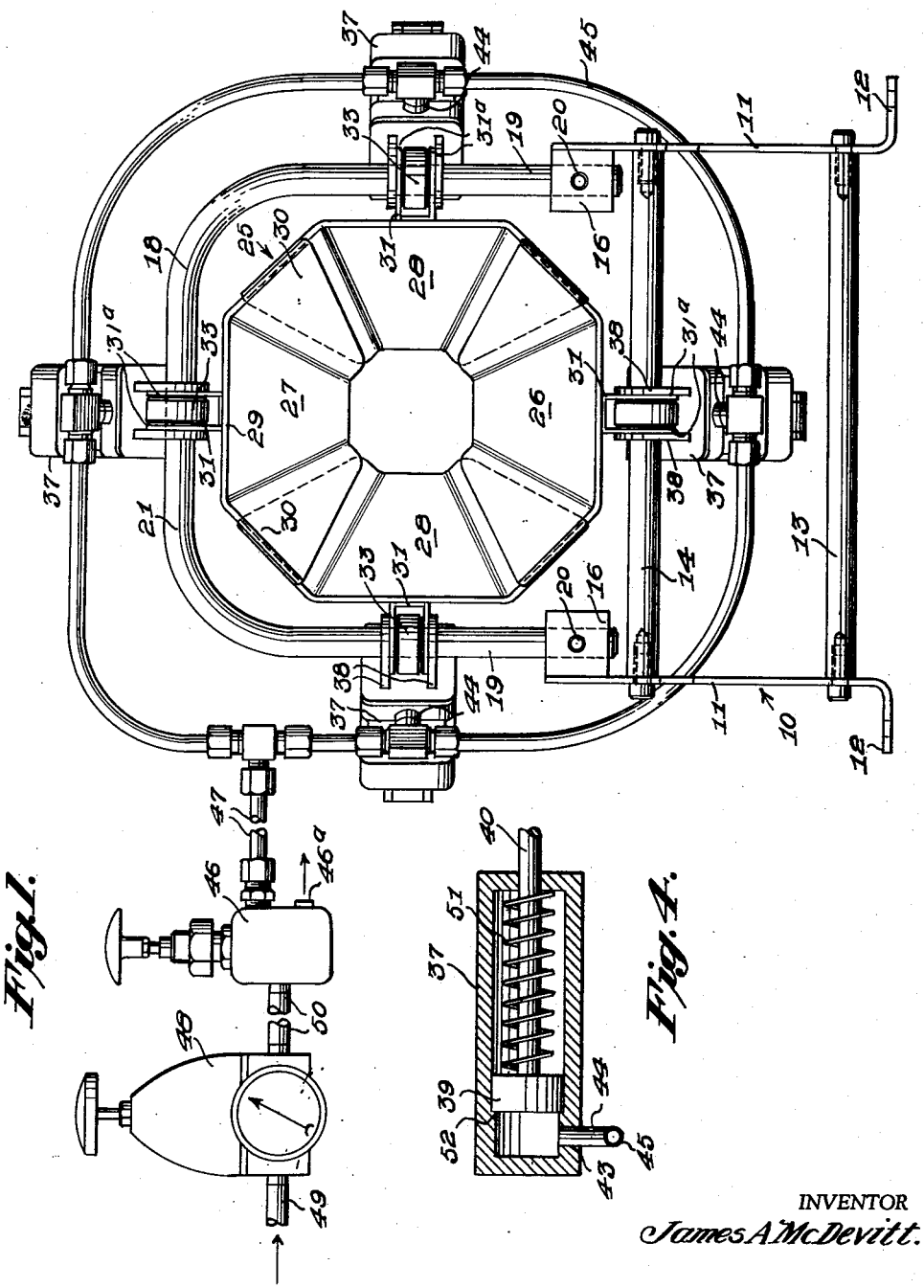

This invention relates to a poultry stuffing horn.

The invention is more particularly concerned with a horn for facilitating the introduction of poultry into elastic bags. A primary object of the invention is to provide an expansible horn over which an elastic bag adapted to receive poultry directed thereinto through the horn may be placed, means manually operable by one hand of an operator to expand the horn and the bag thereon while the operator is inserting the poultry with the other hand, and means for again returning the horn to its initial, collapsed condition after insertion of the poultry into the bag and removal of the bag from the horn.

Another object of the invention is to provide an expansible and contractible poultry receiving horn embodying a plurality of arms for reception within an elastic bag together with means for uniformly expanding said arms with a resulting stretching of hte bag for reception of the poultry therein without damaging the tender skin thereof.

A further object is to provied a novel hollow tapered expansible horn for receiving poultry to be bagged and wherein the horn embodies a plurality of circumferentially disposed arms receivable within an elastic bag, and wherein said arms are uniformly expanded by controlled pneumatic means for uniformly stretching the bag for reception of the poultry therein and for subsequent contraction of the bag into firm contact with the skin of the poultry without damage thereto.

Other objects and advantages of the invention will become apparent in the course of the following detailed description taken in connection with the accompanying drawings wherein:

FIGURE 1 is a front elevational view of the improved horn together wiht an air control valve and an air pressure regulator in operative association with the horn.

FIGURE 2 is a top plan view of the horn, as observed in the direction of the arrow 2 on FIGURE 3.

FIGURE 3 is a vertical longitudinal section of the horn as observed in the plane of line 3—3 on FIGURE 2.

FIGURE 4 is a more or less diagrammatic longitudinal sectional view of one of the air cylinders embodied in the horn structure.

Referring now in detail to the drawings.

The improved poultry stuffing horn structure will be seen to comprise a supporting base 10 which includes a pair of laterally spaced parallel side plates 11 each of which is provided with an apertured foot 12 at each end thereof adapting the frame for rigid support on a table or other working surface by means extending through the apertures in the feet, and into the table. The side plates 11 are rigidly interconnected by tie bars 13, one thereof extending across between the plates adjacent each opposed pair of feet 12, and also, by a pair of bearing bars 14 and 15 disposed above the tie bars 13 as is clearly indicated in FIGURE 3.

Each side plate 11 is provided with a pair of apertured blocks 16 and 17 which are disposed at the upper edge thereof and in horizontally spaced relation and the blocks on each side plate are transversely aligned with those on the other side plate.

An inverted U-shaped yoke 18 of cylindrical cross section has the ends of the opposite parallel legs 19 thereof disposed within apertures in the blocks 16 and secured therein by means 20. The said yoke 18 includes a horizontal connecting or bight portion 21 later referred to.

A second inverted U-shaped yoke 22 of cylindrical cross section has the ends of the opposite parallel legs 23 thereof disposed within the apertures in blocks 17 and secured therein by means 24.

The horn proper 25 is of hollow tapered expansible and retractible sleeve-like form and the same comprises a bottom section 26, a top section 27 and a pair of opposite side sections 28. The sections are all of the same transverse sectional contour and each includes a central portion 29 and opposite side portions 30 in angular relation to the central portion and which side portions in the closed position of the horn overlap as is clearly indicated in FIGURE 1. The sections 26, 27 and 28 provide spaced bag receiving arms.

Each horn section is provided with a U-bracket 31 at the wider end thereof and centrally of the portion 29 and each section is further provided with a second U-bracket 32 intermediate the ends thereof and the brackets 31 and 32 are longitudinally aligned as is clearly indicated in FIGURE 2.

The brackets 31 include laterally spaced ears 31a and the legs 19 of the yoke 18 extend through the apertured ears 31a on the opposite side sections 28 of the horn while the bight portion 21 extends through the apertured ears 31a on the top section 27. The apertured ears 31a of the bracket 31 on the bottom horn section 26 receive the central portion of the bearing bar 14.

Preferably a collar 33 is disposed between the legs of each bracket in surrounding relation to the yoke 18 and and the bar 14 and secured thereto.

By the above described construction the horn sections 26, 27, 28 have their larger ends pivotally supported on fixed axes for inward and outward swinging movement of the smaller bag receiving ends of the sections as will be apparent from FIGURE 2.

A bell crank lever 35 is pivotally supported on the bight of yoke 22, and a like bell crank lever 35 is pivotally supported on each leg 23 of the yoke 22. A further bell crank lever 35 is pivotally supported on the bearing bar 15. Corresponding legs 36 of the bell crank levers 35 are pivotally connected to the brackets 32 as indicated at 36a. An air cylinder 37 is pivotally supported at one end thereof by means of spaced ears 38 disposed on the outer sides of the bracket ears 31a with the yoke 18 and the bearing bar 14 extending through the ears 38 whereby the cylinders are capable of swinging toward and from the respective brackets 32.

Each cylinder 37 is provided with a piston 39 (FIGURE 4) having a piston rod 40, and the free ends of the piston rods 40 are pivotally connected to corresponding legs 41 of the bell crank levers 35 as at 42, whereby upon axial movement of the piston rods the bell crank levers will swing on their pivotal connections with yoke 22 and the bearing bar 15 with a resulting swinging of the horn sections about the yoke 18 and the bearing bar 14. The four air cylinders 37 are each provided with an aperture 43 adjacent one end thereof in which is disposed one end of an air nipple 44 whose opposite end is in communication with an air line 45.

An operating valve 46 having an exhaust port 46a is in communication with the air line through connector 47, and an air pressure regulator 48 having an inlet connector 49 is in communication with the valve 46 through the connection 50.

As indicated in FIGURE 4, a coil spring 51 is disposed within each cylinder 37 in surrounding relation to the respective piston rod 40 and one end thereof abutting the piston and the opposite end thereof abutting an end wall of the cylinder.

Preferably, as indicated in FIGURE 4, each cylinder chamber is provided with a shoulder or equivalent means 52 for limiting inward movement of the piston 39 under action of the spring 51 in order to avoid any blocking entry of air into the cylinder or the exhausting of such air.

Having set forth the structure of the improved horn in accordance with a preferred embodiment thereof, the operation is as follows:

The horn is normally in contracted form as indicated in FIGURE 3 and an elastic poultry receiving bag B is telescoped over the smaller end of the horn as indicated by dot-and-dash lines in FIGURE 3, it being understood that the cylinder springs 51 yieldably retain the horn in the contracted, bag receiving position. In this contracted position of the horn, the valve stem is in the upper position, and air from the pressure regulator 48 is blocked off at the valve 46 and the air line or manifold 45 is bled through the valve exhaust port 46a.

With the bag B positioned as in FIGURE 3 the valve stem is moved into the valve 46 and air passes from the pressure regulator 48, through the valve 46 into the air line or manifold 45 and thence into the horn section operating cylinders 37 whereby the piston rods 40 impart clockwise rotation to the bell crank levers 35 with a resulting expansion of the horn as indicated in FIGURE 2, and a resulting stretching of the elastic bag B, whereupon poultry may be readily pushed into the expanded bag. Thereafter the valve 46 is operated to relieve the air pressure within the cylinders and the bag with the enclosed poultry is moved off the smaller ends of the horn sections 26, 27, 28 and the bag contracts into firm binding contact with the poultry without danger of damaging the skin thereof. At this point, it is to be observed that the springs 51 exert only such pressure on the pistons 39 as is required to return the horn sections to their contracted position indicated in FIGURE 3.

By the provision of an air cylinder for each horn section, the plastic bag B is subjected to uniform pressure throughout the circumference thereof and since the air pressure is readily adjustable by the pressure regulator the bag may be opened just enough to permit easy entrance of the poultry thereinto.

As the operator pushes the poultry through the horn with one hand, the valve 46 can be operated with the other hand thereby providing a very fast operation.

Having set forth the invention in accordance with a single specific structural embodiment thereof, what is claimed and desired to be secured by U.S. Letters Patent is:

1. For use in bagging poultry within an elastic bag, a poultry stuffing horn of open elongated tapered form including a plurality of longitudinal sections having the wider ends thereof pivotally supported on fixed axes, an air cylinder for each of said sections having one end thereof pivotally supported on a respective one of said axes, a piston in each cylinder having a piston rod extending through the opposite end thereof, lever means connecting the free end of each piston rod with a respective horn section, and pressure regulated air supply means for said cylinders to move the pistons away from said pivoted ends with a resulting outward movement of the free ends of said sections for expanding a poultry receiving elastic bag disposed thereon at a controlled pressure.

2. The structure according to claim 1, together with a coil spring disposed within each cylinder in surrounding relation to the respective piston rod and having one end thereof engaged with the respective piston and an end wall of the cylinder.

3. A poultry stuffing horn of open elongated tapered form including a plurality of longitudinal sections having the wider ends thereof pivotally supported on fixed axes, an air cylinder for each of said sections having one end thereof pivotally supported on a respective one of said axes, a piston in each cylinder having a piston rod extending through the opposite end thereof, lever means connecting the free end of each piston rod with a respective horn section, and pressure regulated air supply means for said cylinders to move the pistons away from said pivoted ends with a resulting outward movement of the free ends of said sections for expanding a poultry receiving elastic bag disposed thereon at a controlled pressure, said air supply means including a continuous air line in communication with said cylinders, an air flow control valve in communication with said air line, and a pressure regulator in communication with said valve.

4. Poultry bagging means comprising a fixed base including a pair of spaced parallel side plates, interconnected by a pair of spaced parallel bars, an inverted U-form yoke including a pair of legs and a bight portion disposed above each of said bars and the free ends of the legs of the yokes being secured to said side plates, a hollow expansible and contractible horn disposed within said yokes and above said bars, said horn comprising a pair of vertically opposed longitudinal sections and a pair of laterally disposed longitudinal sections, said sections being tapered from one end thereof to the other and having their wider ends pivotally connected to one of said yokes and the corresponding bar, the opposite ends of said sections being free and adapted to be received within the mouth of an electric bag, bell crank levers pivotally supported by the other yoke and the corresponding bar, connections between the sections and corresponding arms of said bell crank levers, and pneumatic means pivotally supported by said first yoke and corresponding bar and operatively engaged with the other arms of said bell crank levers for moving the sections about their pivotal connection away from the axis of the horn for expanding a poultry receiving elastic bag disposed upon the free end portions of said sections.

5. The structure according to claim 4 wherein said pneumatic means comprises an air cylinder for each section, a piston disposed within each cylinder, a piston rod extending through an end wall of each cylinder and connected to a respective one of said other arms of the bell crank levers, a continuous air line in communication with said cylinders, an air control valve in communication with said air line and a pressure regulator in communication with said valve.

6. The structure according to claim 5 together with a horn section retracting coil spring surrounding each piston rod and having one end thereof engaged with the respective piston and the opposite end thereof engaged with an end wall of the cylinder.

7. The structure according to claim 1, wherein the air supply means comprises a manifold surrounding the horn sections and having a direct connection with each horn connected cylinder.

8. A poultry stuffing horn of open elongated tapered form including a plurality of longitudinal sections having the wider ends thereof pivotally supported on fixed axes, an air cylinder for each of said sections having one end thereof pivotally supported on a respective one of said axes, a piston in each cylinder having a piston rod extending through the opposite end thereof, lever means connecting the free end of each piston rod with a respective horn section, and pressure regulated air supply means for said cylinders to move the pistons away from said pivoted ends with a resulting outward movement of the free ends of said sections for expanding a poultry receiving elastic bag disposed thereon at a controlled pressure, the air supply means including a manifold surrounding the horn sections and having a direct connection with each horn connected cylinder, an air supply line connected with the manifold, and a manually operable control valve in said supply line.

9. Poultry bagging means comprising a fixed base including a plurality of bars arranged generally in end-to-end relation, a hollow expansible and contractable horn disposed generally within said bars, said horn comprising a pair of vertically opposed longitudinal sections and a pair of laterally disposed longitudinal sections, said sections being tapered from one end thereof to the other and having their wider ends pivotally connected to said bars, the opposite ends of said sections being free and adapted to be received within the mouth of an elastic bag, levers pivotally supported by said base, connections between said sections and corresponding ones of said levers, and pneumatic means pivotally connected to said bars and operatively engaged with said levers for moving said sections about their pivotal connections away from the axis of said horn for expanding a poultry receiving elastic bag disposed upon the free end portions of said sections.

10. A poultry bagging structure for bagging poultry within an elastic bag comprising a hollow poultry receiving horn including a plurality of elongated sections pivotally supported at corresponding ends thereof, the opposite ends of said sections being receivable within an elastic bag, means normally contracting said sections about their pivotal connections for admission of said ends into said bag, and pressure regulated pneumatic means operatively engaged with said sections for expanding same about their pivotal connections with a resulting pressure controlled distention of the elastic bag for admission of the poultry thereinto, said pneumatic means comprising an air cylinder operatively engaged with each horn section, and said first means comprising a spring disposed within each air cylinder.

References Cited in the file of this patent
UNITED STATES PATENTS

| | | |
|---|---|---|
| 803,357 | Peile et al. | Oct. 31, 1905 |
| 1,029,500 | Harris | June 11, 1912 |
| 2,066,449 | Barrett | Jan. 5, 1937 |
| 2,608,332 | Pottle | Aug. 16, 1952 |
| 2,711,848 | Capps | June 28, 1955 |
| 2,843,984 | Dunning | July 22, 1958 |
| 2,869,296 | Overman | Jan. 20, 1959 |
| 2,885,850 | Smith | May 12, 1959 |